ROBERT C. AYERS, JR. INVENTOR.

BY
Lewis N. Catherton
ATTORNEY

Sept. 20, 1971  R. C. AYERS, JR  3,605,891
OIL RECOVERY PROCESS BY MISCIBLE DISPLACEMENT
Filed March 3, 1969  3 Sheets-Sheet 2

ROBERT C. AYERS, JR. INVENTOR.

BY

*Lewis H. Gatherton*

ATTORNEY

United States Patent Office 3,605,891
Patented Sept. 20, 1971

3,605,891
OIL RECOVERY PROCESS BY MISCIBLE
DISPLACEMENT
Robert C. Ayers, Jr., Houston, Tex., assignor to
Esso Production Research Company
Filed Mar. 3, 1969, Ser. No. 803,702
Int. Cl. E21b 43/22
U.S. Cl. 166—273                                      5 Claims

ABSTRACT OF THE DISCLOSURE

In a process for the recovery of oil from a subterranean formation using as a first bank a polar organic solvent and as a second bank an aqueous surfactant solution, an organic additive is added to the surfactant solution. The organic additive decreases the density of the surfactant solution and reduces the tendency of the second bank to underride the first bank. The organic additive also decreases the amount of surfactant which must be employed in the second bank to cause the second bank to miscibly displace the first bank and to be miscibly displaced by the following flood water. The organic additive must be highly soluble in both the polar organic solvent and water. The density of the organic additive should be approximately that of water or less.

BACKGROUND OF THE INVENTION (1) Field of the invention

This invention relates to a process for recovering oil from a subterranean formation utilizing a well into which a fluid is injected and is caused to enter the pores of the formation. More particularly, this invention relates to a process for displacement and recovery of reservoir oil by injecting a bank of polar organic solvent into a reservoir followed by a second bank of an aqueous solution of surfactant and organic additive. The two banks are driven into the formation by following flood water.

(2) Description of the prior art

It is generally recognized that a solvent can readily be selected which is miscible with crude petroleum and that efficient recovery of the crude can be achieved by displacing such a solvent through a reservoir.

The single bank process has not proven to be a realistic possibility. There is no single solvent which is capable of miscibly displacing the reservoir oil and which is capable of being miscibly displaced by following flood water for more than a short distance through the reservoir. Following injection into the reservoir, the solvents become contaminated with oil, water, or both. The contamination causes the solvents to loose solubility with either the oil being displaced or the following flood water. It has been proposed, therefore, that multiple banks of fluids be employed for miscible displacement of the reservoir crude and subsequent miscible displacement of the solvent banks by following flood water.

Recent efforts have sought to provide at least two successively injected solvent banks: (1) a leading bank capable of miscibly displacing the crude oil, and (2) a second bank of solvent having mutual solubility with both leading bank and with water. However, contamination of the banks with the water or oil causes these banks to lose solubility with one another. Economic considerations prohibit the use of more than two banks in most instances.

To combat this problem, it has been proposed to employ as a second bank a highly concentrated solution of surface active agent or surfactant. The first bank in most instances is a polar organic material having a relatively high molecular weight and preferentially oil soluble. This bank is followed by an aqueous solution of a low molecular weight surfactant solution. The concentration of surfactant in the aqueous bank must be sufficiently high to permit miscible displacement of the preceding polar organic solvent bank.

The high concentrations of surfactant employed in the aqueous bank present a number of problems. First, the density of most surfactants is so high that severe underriding of the preceding polar organic solvent bank may occur during the process. In a typical situation the density of the preceding polar organic solvent may be approximately 0.8, while the density of a 30 percent solution of a surfactant such as sodium xylene sulfonate will be about 1.1. Moreover, capillary forces operating on the polar organic solvent tend to counteract the effect of gravity on that bank. Capillary forces have little effect on the aqueous surfactant solution since such a solution has a radically reduced interfacial tension. The following surfactant bank is thus heavier than the preceding polar organic solvent and strong capillary forces are not present to counteract the force of gravity on the surfactant bank. As a net result, the surfactant bank tends to underride the preceding polar organic solvent bank resulting in a loss of vertical conformance between the two banks.

Equally important are the economics involved. The surfactants employed in the practice of this invention are relatively expensive materials. If these surfactants can be replaced in part by a less expensive material without appreciable loss in the ability of the aqueous bank to miscibly displace the polar organic bank, appreciable savings in cost could be realized.

SUMMARY OF THE INVENTION

This invention relates to a method of miscibly displacing a reservoir crude oil utilizing a first bank of polar organic solvent, a second bank of surfactant, organic additive and water, and a following bank of flood water. The polar organic solvent is chosen for its ability to miscibly displace the reservoir oil and to be miscibly displaced by the second bank. The surfactant and organic additive are chosen to miscibly displace the preceding polar organic solvent in the presence of water and to be miscibly displaced by following flood water. The organic additive which is present in the aqueous surfactant solution is chosen for its ability to reduce the density of the aqueous surfactant bank. The organic additive also reduces the quantity of surfactant which must be employed to miscibly displace the first bank and to permit miscible displacement of the second bank by the following flood water.

It is an object of this invention to improve the recovery of oil from subterranean formations.

It is a further object of this invention to reduce the density of a surfactant solution employed in a multi-bank displacement process for the recovery of oil.

It is a further object of this invention to reduce the quantity of surfactant which must be employed in a multi-bank displacement process for the recovery of oil.

BRIEF DECRIPTION OF THE DRAWINGS

DESCRIPTION OF THE PREFERRED EMBODIMENT

The flow behavior of a solvent bank in a porous, permeable reservoir and the mechanism by which it miscibly displaces the reservoir oil has been the subject of several prior disclosures. Miscible displacement is generally recognized as a preferred mechanism of oil recovery, in order that on a pore volume basis much smaller, more economical banks of injected solution can be employed to obtain maximum oil recovery.

It is known that a solvent bank which is substantially immiscible or has only limited solubility with water can itself be efficiently recovered, in a manner closely analogous to miscible displacement, by injecting an aqueous surfactant solution, preferably followed by ordinary water or brine. The flow behavior and the mechanism by which the solvent and surfactant solution are displaced resembles true miscible displacement.

When the term "miscible" is used herein with reference to two liquids, it is used in its special, technical sense. Two liquids are miscible as defined herein when they can be mixed in all proportions without phase separation. While the term "miscible displacement" is used to describe the recovery mechanism of this process, it should be understood that it is not necessary that the liquid banks be miscible as defined herein. It can be shown that one liquid can miscibly displace another even though the two liquids are not themselves miscible. A brief explanation of this phenomenon may clarify this apparent contradiction.

In the analysis of miscible displacement systems, ternary diagrams of the phase behavior or conditions of the fluid components are essential tools. These ternary diagrams show the component concentrations at which a single phase will be present and the component concentrations at which multiple, immiscible phases will occur.

Figure 1:
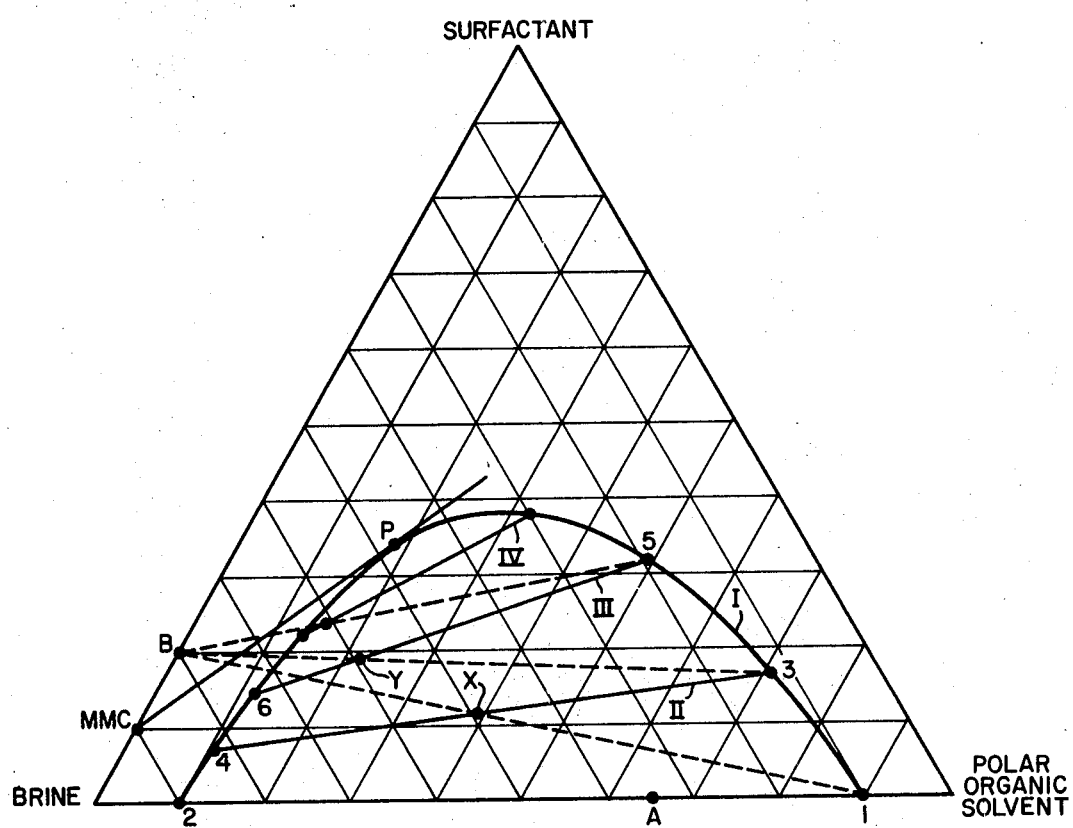
FIG. 1 is a ternary phase diagram illustrating the phase behavior of a hypothetical polar organic solvent-surfactant-brine system.
Figure 2:
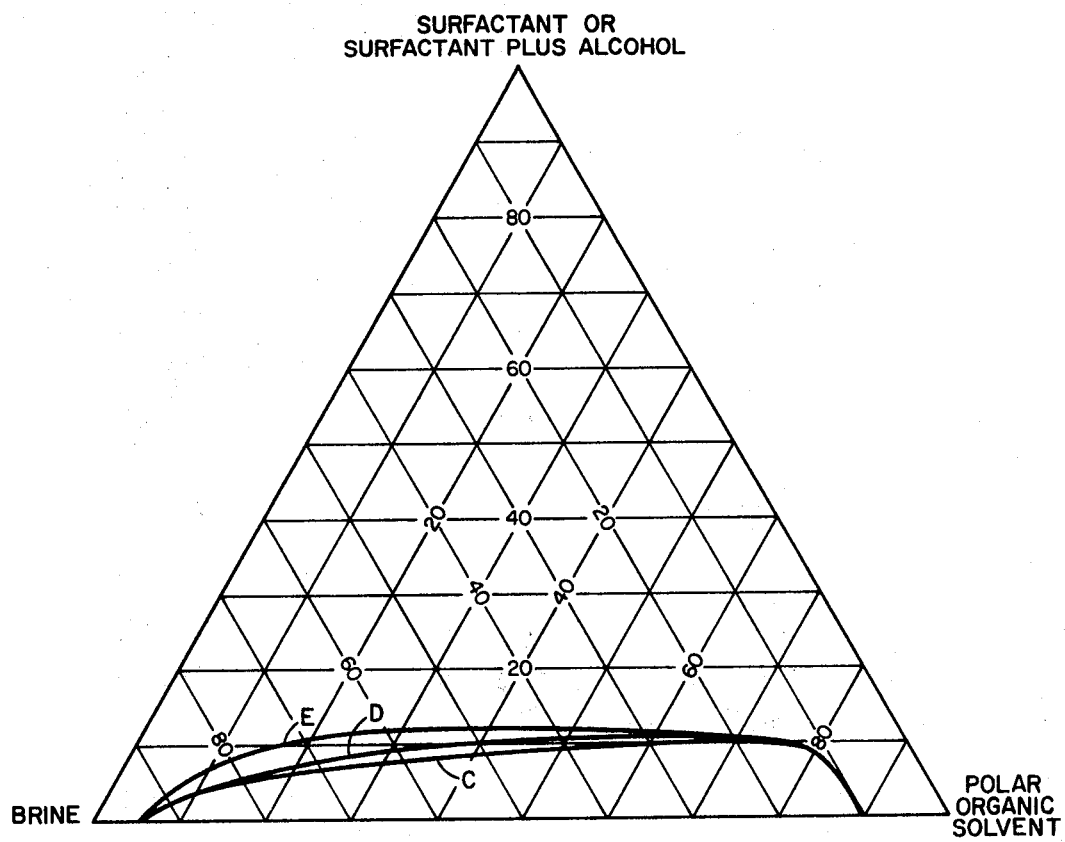
FIG. 2 is a ternary phase diagram illustrating the phase behavior of a polar organic solvent-surfactant-brine system and illustrating the effect of adding an organic additive such as methanol to the surfactant component of the system.
Figure 3:
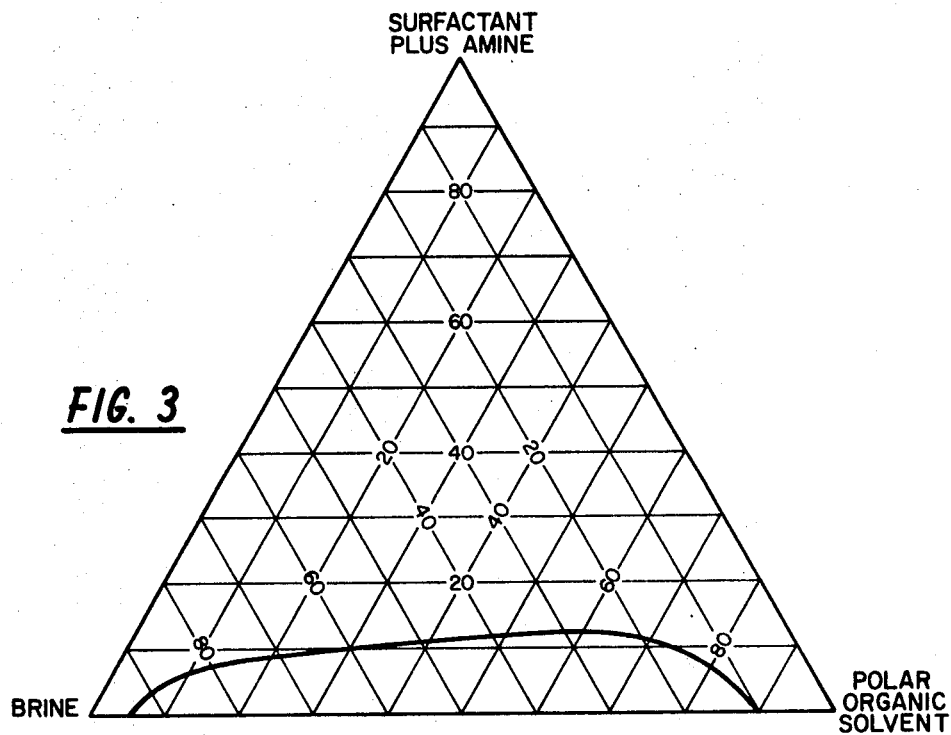
FIG. 3 is a ternary phase diagram for a polar organic solvent-surfactant-brine system with an amine added to the surfactant component.
Figure 4:
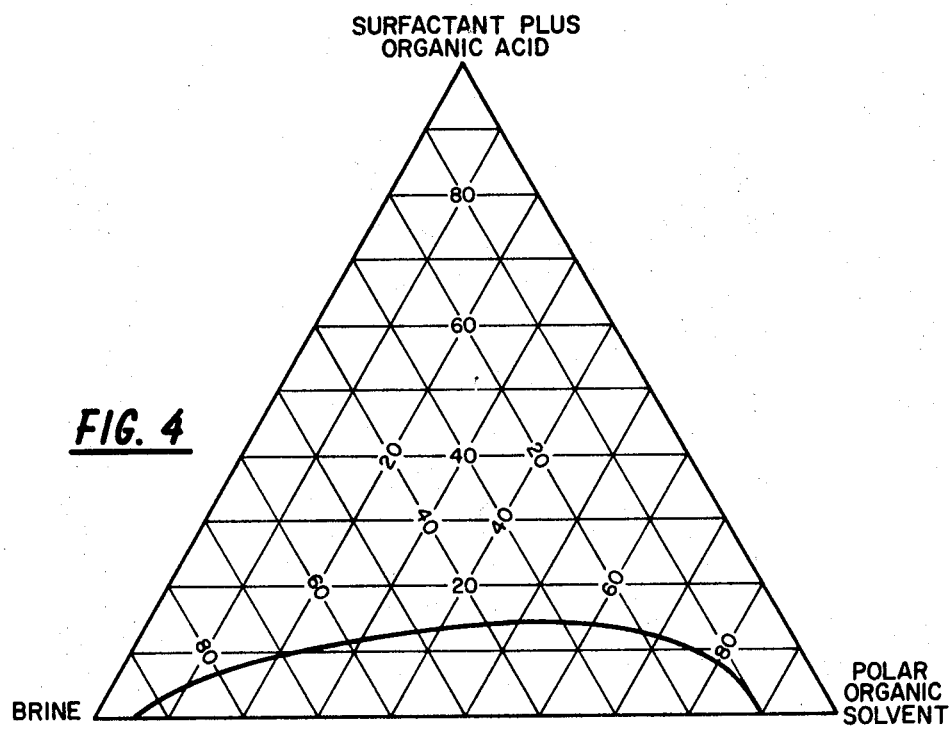
FIG. 4 is a ternary phase diagram for a polar organic solvent-surfactant-brine system with an organic acid added to the surfactant component.

FIG. 1 is a ternary diagram of a hypothetical surfactant-brine-polar organic solvent system. A hypothetical system is used to illustrate the principles of the recovery process since the two phase regions of the actual systems of FIGS. 2, 3 and 4 are too small for a clear illustration. The principles illustrated in FIG. 1 are nonetheless equally applicable to the systems used in this process.

The curved line I in FIG. 1 represents the binodal curve for this system. The area beneath the binodal curve represents concentrations at which the components will form two distinct and immiscible phases. The lines, II, III, and IV, beneath the binodal curve are three representative tie lines in this two phase region. Tie lines are traces of the various concentrations of the three components which will form two phases of given compositions. For instance, any mixture of the three components which falls on tie line II will form two phases. One phase will be solvent rich and have a composition shown at 3. The other phase will be brine rich and have a composition shown at 4. Fluids having compositions such as 3 and 4 will be referred to hereafter as fluids 3 and 4. The tie lines merge at a point "P" on the binodal curve which is called the "plait point." At this point, the compositions of the phases within the two phase region become identical.

The area of the ternary diagram which is outside of the binodal curve is the single phase region. Two liquids having overall compositions which fall within this region will mix without phase separation. Within the ternary diagram near the surfactant apex, there is generally another two phase region representing a solid and saturated liquid mixture. For purposes of clarity, this second two-phase region is not shown on the figure.

The polar organic solvent used in this process is chosen so that it is miscible with the reservoir oil. Under ideal conditions, the polar organic solvent bank will totally displace the reservoir oil and leave only the formation brine and polar organic solvent as residual fluids. Point A on the ternary diagram represents the overall composition of the brine-polar organic solvent mixture existing at the trailing edge of the polar organic solvent bank. Since point A lies within the two phase region of the ternary diagram, it represents the average composition of two immiscible fluids, fluids 1 and 2.

It has been found that a Minimum Miscibility Concentration for the surfactant in the surfactant-brine solution can be determined by drawing a line tangent to the binodal curve at the plait point and intersecting the brine-surfactant side of the ternary diagram. This point of intersection is denoted as the MMC in FIG. 1. An aqueous surfactant solution having a surfactant concentration which is at least as great as the MMC is capable of miscibly displacing any mixture of brine-polar organic solvent. This is true no matter what the relative concentrations of brine and polar organic solvent are.

For purposes of illustration, a surfactant solution having a composition B is assumed to follow and displace the polar organic solvent bank. Since all mixtures of fluid 2 and fluid B lie within the single phase region of the ternary diagram, these fluids are miscible as defined herein. Fluid 2 will therefore be displaced from this point in the reservoir at the same rate that fluid B is introduced. As can be seen by the ternary diagram, however, fluid 1 is not miscible with fluid B because a line drawn between these two fluids passes through the two phase region of the ternary diagram. When fluid 1 is contacted with fluid B, the overall composition of the mixture of these two fluids may be represented by point X. Since point X lies on tie line II, the mixture will form two immiscible fluids having the compositions shown at points 3 and 4. Fluid 4, like fluid 2, is miscibly displaced by additional, inflowing quantities of fluid B. Fluid 3 will mix with additional quantities of fluid B to form two phases having the overall composition Y on tie line III and the individual compositions shown at point 5 and 6. In this manner, the phases which are miscible with fluid B are displaced from this point in the reservoir. The immiscible phases are successively mixed with fluid B until ultimately the solvent rich phase is also miscible with fluid B. These fluids are then miscibly displaced.

For purposes of clarity only three tie lines have been shown on the ternary diagram and the process has been described as a series of discrete steps. It should be understood, however, that there will be an infinite number of tie lines and compositions during the course of an actual recovery operation and the displacement will take place in a continuous rather than in a step-like manner.

It has now been found that this process can be further improved by employing an organic additive in the surfactant bank. The organic additive will reduce the tendency of the surfactant bank to underride the solvent bank and will reduce the quantity of surfactant which must be employed for miscible displacement.

FIGS. 2–4 are illustrative of the phase conditions within the reservoir following displacement of the reservoir oil by the polar organic solvent. Since the polar organic solvent is chosen so that it is miscible with the reservoir oil, ideally the oil will be totally displaced by the solvent and no oil will be present when the solvent is contacted by the surfactant bank. The figures thus illustrate the phase conditions during the displacement of the surfactant-organic additive bank by the following flood water.

FIGS. 2–4 illustrate the phase behavior of various polar organic solvent-brine-detergent plus organic additive systems. In each of these figures the polar organic solvent is tertiary amyl alcohol, the surfactant is sodium xylene sulfonate and the brine is distilled water containing the following:

| Ion: | Concentration, p.p.m. |
|---|---|
| $Na^+$ | 9,000 |
| $Ca^{2+}$ | 740 |
| $Mg^{2+}$ | 258 |
| $Ba^{2+}$ | 28 |
| $Cl^+$ | 16,000 |
| $HCO_3^-$ | 26 |

The binodal curves of FIGS. 2–4 can be determined in the following manner. First, the solubility of the polar organic solvent in the brine is determined by adding solvent slowly to the brine until two phases are formed. This represents the solubility limit of the solvent in the brine and fixes the left hand extent of the binodal curve on the brine-solvent side of the ternary diagram. Next, brine is slowly added to a pure solution of polar organic solvent. When two phases are noted in this mixture, the solubility limit of brine in solvent is determined. This fixes the right hand extent of the binodal curve. To determine the shape of the binodal curve between these points, various mixtures of brine and solvent are prepared which lie within the two phase region or between the right and left hand extents of the binodal curve. Measured amounts of the surfactant are then added to each of these two phases mixtures and the amount of surfactant required to form a single phase is measured for each of the original compositions. The weight percent of each of the three components is determined at the point where each of the solutions changes from a two phase to a single phase solution. Each of these points represent a point on the binodal curve and the binodal curve is constructed by passing a line through these points The same procedure is followed for solutions containing surfactant plus organic additive. The ratio of surfactant to organic additive may also be varied to form a family of binodal curves each of which represents a different surfactant-organic additive combination.

FIG. 2 illustrates the effect of adding methanol to a brine-polar organic solvent-surfactant system. Curve C represents the binodal curve of the system when no methanol is present. Curve D represents the binodal curve of the system when the surfactant and methanol are present in the ratio of two parts surfactant to one part methanol. Curve E represents the binodal curve of the system when the surfactant and methanol are present in equal proportions.

FIG. 3 is a ternary phase diagram of a polar organic solvent-brine surfactant plus amine system. The amine utilized in this system was diethylaminopropylamine and the binodal curve represents the demarcation between the single phase and the two phase regions of this system with the amine present in equal proportions with the surfactant.

FIG. 4 illustrates the phase relationships in a polar organic solvent-brine-surfactant plus organic acid system. The organic acid utilized in FIG. 4 was acetic acid. The binodal curve represents the demarcation between the single phase and two phase regions of the system when the surfactant and acetic acid are present in equal proportions.

The organic additive to be employed in the practice of this invention should have the characteristics of high solubility in water and the polar organic compound. It should have a low density and be in a liquid state at standard temperature and pressure. The organic additive should have little adverse effect on the ternary diagram and should be relatively inexpensive.

With respect to the solubility characteristics of the organic additive, it is preferred that the organic additive be miscible as defined herein with both water and the polar organic solvent. In certain instances, it may be desired to employ a polar organic additive which is not miscible, but merely very highly soluble in both of the other liquids. The term "very highly soluble" means that to a given quantity of one of the liquids, either water or polar organic solvent, at least an equal quantity and all lesser quantities of the organic additive may be added without phase separation.

The organic additive should have no substantial adverse effect on the ternary diagram. Preferably, the two phase area of the ternary diagram with the organic additive present in the desired proportions should not be greater than twice the area of the two phase envelope in the absence of the organic additive. However, a greater change can be tolerated if the other criteria are favorable.

It is preferred that the density of the organic additive be approximately that of water or less. The lower the density of the organic additive, the greater its ability to reduce underriding of the surfactant bank. The density may approach the density of the surfactant solution, however, without making the underriding worse.

It is preferred that the organic additive be in its liquid state at atmospheric temperature and pressure to facilitate surface mixing of the components of the surfactant bank materials, i.e., surfactant, organic additive, water. Organic additives which have a boiling point near or slightly below surface temperature at surface pressure may be employed, however, since these additives will remain in solution at the concentration levels employed in the practice of this invention.

A paramount consideration in the choice of an organic additive to be employed in the practice of this invention is its cost. Preferably, the organic additive should be no more expensive than the surfactant which it replaces. A slightly higher cost can be tolerated, however, if the other criteria of the organic additive justify the additional expense. For instance, a relatively expensive organic additive could be employed if low concentrations of the organic additive sharply reduced the tendency of the surfactant bank to underride.

Methyl alcohol is the preferred organic additive for use in the practice of this invention. Methanol is miscible with water and the polar organic solvents used in the practice of this invention. Methanol has a density which is only 80 percent of the density of water. Methanol has no substantial adverse effect on the ternary diagram as shown by FIG. 2. Moreover, methanol reduces the cost of the surfactant bank with no substantial adverse effect on its solubility characteristics. The following table illustrates the economic benefit achieved by employing methanol in the surfactant bank.

TABLE 1

| Solution | C | D | E |
|---|---|---|---|
| Percent sodium xylene sulfonate | 30 | 20 | 15 |
| Percent methanol | 0 | 10 | 15 |
| Percent active ingredients | 30 | 30 | 30 |
| Percent brine | 70 | 70 | 70 |
| Specific gravity | 1.12 | 1.04 | 1.03 |
| Estimated cost, $/bbl | 5.89 | 4.99 | 3.25 |

Solutions C, D, and E correspond to the solutions illustrated in FIG. 2. As can be noted from inspection of FIG. 2, there is no substantial adverse effect on the ternary diagram due to addition of the methanol. It should be noted from the table, however, that in Solution D the methanol reduces the density of the surfactant bank by approximately 8 percent, and the cost per barrel is reduced by 15 percent. Solution E further reduces the density of the surfactant bank and lowers the cost per barrel by nearly one-half.

Suitable materials for use as the organic additive include alcohols, amines, ketones, aldehydes, and carboxylic acids. Suitable examples of usable materials include the mono-hydroxy alcohols such as methanol, ethanol, n-propanol, iso-propanol and tert-butanol. Suitable polyhydroxy alcohols include 1,2 - propanediol, 1,3 - propanediol, 1,4-butanediol, and 2,3-butanediol. Suitable amines include ethylamine and diethylamine, n-propylamine, iso-propylamine, butylamine, benzylamine, and diamines such as diethylaminopropylamine. Acetone and acetylaldehyde are examples of suitable ketones and aldehydes. Of the organic acids only the lower molecular weight acids are suitable. Examples are acetic, propionic, and butyric acid.

The quantity of organic additive to be employed in the surfactant solution may vary widely. The amount to be used is a function primarily of the effect on the solubility characteristics of the surfactant bank and economics. Generally, it is preferred to employ approximately equal quantities of surfactant and organic additive. In most systems, such a ratio can be tolerated without substantial detrimental effect on the solubility characteristics of the surfactant bank. The amount of change of solubility characteristics that can be tolerated is, however, a function of economics. In most instances, substitution of a portion of the surfactant with the organic additive will have some detrimental effect on solubility of the surfactant solution. However, a fairly major change in solubility can be tolerated if the material employed is substantially less expensive than the surfactant. In many instances, there will be a radical reduction in cost in the surfactant bank without a substantial change in solubility as shown by FIG. 2 and Table 1.

Suitable classes of polar organic solvents for use in accordance with the invention include the normal, secondary, tertiary, cyclo- and iso-alcohols having 4–16 carbon atoms per molecule; the normal, secondary, tertiary, cyclo- and iso-amines having 6–12 carbon atoms per molecule; phenol and substituted phenols having side chains with 1–10 carbon atoms per molecule; normal, secondary, tertiary, cyclo- and iso-mercaptans having 2–10 carbon atoms per molecule; fatty acids having 5–22 carbon atoms per molecule; ketones having 4–18 carbon atoms per molecule, ethers having 4–18 carbon atoms per molecule; aldehydes having 4–18 carbon atoms per molecule; and mixtures of two or more of the above solvents. Each of these examples may contain saturated or unsaturated carbon-carbon bonds.

The polar organic solvent may be injected as a pure compound or as a crude mixture containing other oxygenated hydrocarbon products or containing inert materials having no detrimental effect upon the ability of the solvent bank to displace the reservoir oil. For example, a suitable commercial source of oxygenated hydrocarbons comprising a crude mixture of alcohols, ketones, acids and aldehydes may be obtained by the direct catalytic reaction of air or other oxygen-comprising gas with light paraffinic or olefinic hydrocarbons, such as a light petroleum distillate, in accordance with known procedures. The injected solvent may contain water or brine up to the limit of its solubility therein. Solvent recovered at production wells may be separated from the oil and reinjected elsewhere in the same reservoir, or in a separate reservoir.

Suitable surfactants include anionic and non-ionic compounds including sulfonated aromatic hydrocarbons, sulfonated aromatic hydrocarbons with aliphatic or cyclic substituents, ethylene oxide condensates of aliphatic acids, alkyl aryl polyalkylene glycol ethers, esters of sulfosuccinic acid, mono- and dibasic carboxylic acids, and alkyl sulfates. Cationic surfactants may also be employed but are not preferred due to the tendency of such materials to strongly adsorb on the formation surface.

The preferred surfactants for injection in aqueous solution with the organic additive to displace the polar solvent bank are benzene sulfonic acid, naphthalene sulfonic acid, alkyl aryl sulfonic acids having 7–13 carbon atoms per molecule, and water-soluble salts of any of these acids, including mixtures of two or more of the acids or salts.

Of the preferred surfactants, the alkyl benzene sulfonates having one to seven alkyl carbons per molecule are generally superior. Specific examples include toluene sulfonate, cumene sulfonate, normal amyl benzene sulfonate, xylene sulfonate, tertiary and normal butyl benzene sulfonate, and butyl toluene sulfonate. Typically, these sulfonates are injected as alkali metal or ammonium salts; however, the sulfonic acids may be injected as such without neutralization. To some extent, the acids react with the reservoir rock to form salts in situ.

The short-chain alkyl benzene sulfonates are far superior to the well-known long-chain alkyl benzene sulfonates, primarily because of the solubility of their calcium and magnesium salts, and their much lower adsorptivity on reservoir rock or clay. They are compatible in aqueous solutions with polymeric thickeners used to improve the mobility ratio between the sulfonate bank and the solvent band it displaces. Moreover, the phase diagram of the sulfonate-water-solvent system is substantially unaffected by the presence of the polymer.

The concentration of surfactant plus organic additive useful in accordance with the present invention lies in the range of about 2 percent by weight up to the solubility limit of the surfactant, preferably from 5 percent to 40 percent by weight, based on the total weight of the injected surfactant plus organic additive in the solution.

It is also contemplated that thickening agents may be employed in the polar organic solvent and in the flood water to increase the viscosity of these fluids. Such thickening agents are well-known to those skilled in the art and a suitable thickener for a given fluid can be readily selected. It is only important that the thickener be soluble in the fluid at the concentration level necessary to give the desired viscosity and not be strongly adsorbed on the formation surface.

What is claimed is:

1. A method for recovering oil from a subterranean oil-bearing formation comprising:
   (a) injecting into the formation a bank containing polar organic solvent, said bank being miscible with the oil;
   (b) then, injecting into the formation an aqueous solution of a surfactant and a low molecular weight organic additive liquid which is at least very highly soluble in water, the solution being capable of miscibly displacing the polar organic solvent bank and being capable of being miscibly displaced by an aqueous flood medium;
   (c) displacing the polar organic solvent bank and aqueous solution into the formation by an aqueous flood medium; and
   (d) recovering oil from the formation.

2. A method as defined in claim 1 wherein the organic additive is a low molecular weight alcohol.

3. A method as defined in claim 2 wherein the low molecular weight alcohol is methanol.

4. A method as defined in claim 1 wherein the organic additive is selected from the group consisting of alcohols, amines, ketones, aldehydes, and organic acids.

5. A method as defined in claim 1 wherein the polar organic solvent bank and aqueous solution are injected into the reservoir by means of an input well and oil is recovered from the formation by means of a withdrawal well.

References Cited

UNITED STATES PATENTS

| | | | |
|---|---|---|---|
| 3,482,631 | 12/1969 | Jones | 166—273 |
| 3,236,303 | 2/1966 | Csaszar | 166—274 |
| 3,270,811 | 9/1966 | Meyer et al. | 166—273 |
| 3,373,809 | 3/1968 | Cooke | 166—273 |
| 3,410,342 | 11/1968 | Abdo | 166—274 |
| 3,446,282 | 5/1969 | Cooke | 166—274 |

OTHER REFERENCES

Slobod, R. L.: Research on Methods for Improving Oil Recovery from Pennsylvania Oil Fields, in Producers Monthly, January, 1960, pp. 16–27.

IAN A. CALVERT, Primary Examiner